United States Patent [19]

Sekmakas et al.

[11] 3,993,627

[45] Nov. 23, 1976

[54] LOW TEMPERATURE CURING CORROSION RESISTANT POLYURETHANE COATINGS OF HIGH SOLIDS CONTENT

[75] Inventors: Kazys Sekmakas, Chicago; Paul Petrovich, Addison, both of Ill.

[73] Assignee: DeSoto, Inc., Des Plaines, Ill.

[22] Filed: Feb. 18, 1975

[21] Appl. No.: 550,849

Related U.S. Application Data

[63] Continuation-in-part of Ser. No. 462,564, April 19, 1974, Pat. No. 3,933,760.

[52] U.S. Cl. .................. 260/47 CB; 260/77.5 CR; 260/77.5 AP
[51] Int. Cl.² .................................... C08G 18/32
[58] Field of Search ............... 260/77.5 CR, 47 CB, 260/77.5 AT

[56] References Cited
UNITED STATES PATENTS

| | | | |
|---|---|---|---|
| 3,245,941 | 4/1966 | Mayer et al. | 260/31.6 |
| 3,250,745 | 5/1966 | Davis et al. | 260/47 CB |
| 3,256,215 | 6/1966 | Doedens et al. | 260/47 CB |
| 3,304,286 | 2/1967 | Altscher et al. | 260/47 CB |
| 3,330,781 | 7/1967 | Gemeinhardt et al. | 260/47 CB |
| 3,375,224 | 3/1968 | Cordier et al. | 260/47 CB |
| 3,376,252 | 4/1968 | Peiser et al. | 260/45.7 |
| 3,391,110 | 7/1968 | Coleman | 260/47 CB |

*Primary Examiner* — M. J. Welsh
*Attorney, Agent, or Firm* — Dressler, Goldsmith, Clement, Gordon & Shore, Ltd.

[57] ABSTRACT

A low temperature curing polyurethane coating system of high solids content at any given viscosity is provided which enables the deposition of adherent corrosion resistant coatings having a desirable balance of hardness and flexibility by using a mixture of (1) a solution copolymer consisting essentially of from 55–85% styrene and monoethylenically unsaturated hydroxy functional monomer, the copolymer being in solution in a mixture of (A) inert water-free volatile organic solvent and (B) a bisphenol-based polyhydric alcohol, and (2) an organic polyisocyanate. The polyisocyanate is kept separate from the copolymer solution until the desired liquid mixture is formed and used.

12 Claims, No Drawings

LOW TEMPERATURE CURING CORROSION RESISTANT POLYURETHANE COATINGS OF HIGH SOLIDS CONTENT

This application is a continuation-in-part of our prior application Ser. No. 462,564, filed Apr. 19, 1974 and now U.S. Pat. No. 3,933,760.

The present invention relates to low temperature curing two-package polyurethane coatings of high solids content adapted to deposit hard, flexible and corrosion resistant adherent films on steel surfaces. Spray application, particularly using electrostatic force, is particularly contemplated.

It is known to provide two component coatings in which an organic polyisocyanate, on the one hand, is combined with an hydroxyl bearing resin, on the other hand. The mixture reacts at low temperature and can be applied before the reaction has proceeded to thicken the mixture excessively. The hydroxyl bearing resin is usually a polyester or polyether. The reaction produces a polyurethane, and it has the advantage that very little energy is required.

While these two component coating systems have many favorable attributes, they have not been well received by the appliance industry because adhesion to the steel substrate has been inadequate and the high corrosion resistance demanded by this industry has not been present. Corrosion resistance is used herein generically to embrace resistance to chemical attack which may be evidenced by inadequate resistance to detergents, salt spray, humidity, or staining. Our prior application provided the improved adhesion and improved corrosion resistance which were needed, but the solutions of hydroxy copolymer and polyisocyanate these employed are excessively viscous at desired solids content so that the solids content had to be lowered, particularly to enable electrostatic spray application. Material transfer in electrostatic spraying is limited and high solids content is needed for rapid build of solids in the applied film.

In accordance with the invention described in our prior application, a solution copolymer is employed which contains from 55–85% of styrene, preferably from 65–80% of styrene, and the balance of the copolymer consists essentially of monoethylenically unsaturated hydroxy functional monomer. This copolymer, in organic solvent solution, constituted one package of a two package system, the second of which is an organic polyisocyanate.

Our prior application is based on the discovery that the use of these styrene-based hydroxy functional solution copolymers in the low temperature curing polyurethane two package systems described, unexpectedly yields excellent detergent, salt spray, and stain resistance. Moreover, the cure is rapid, and the cured product is hard and flexible, and has satisfactory impact resistance despite the very high level of hard and brittle styrene monomer, and the absence of any flexibilizing monomer. These well balanced properties in a low temperature curing system represent a significant advance in the art. Curiously, the use of flexibilizing monomers in this system, which one would think to be essential, seriously degrades the corrosion resistance, e.g., the detergent, salt spray, and stain resistance properties.

In this invention it has been found that when the solution polymerization of the hydroxy polymer is carried out in the presence of a bisphenol-based polyhydric alcohol, so that both inert solvent and reactive polyhydric alcohol are present, the molecular weight is lowered and some of the solvent is independently reactive, leading to higher solids content at any given application viscosity. A similar result is obtained by adding the bisphenol-based polyhydric alcohol after copolymerization, but then the molecular weight is not lowered and the improvement is less satisfactory.

The use of a bisphenol-based polyhydric alcohol is critical herein since numerous other polyhydric alcohols have been tried, but every trial resulted in impaired corrosion resistance. Specifically, we tried Cardura E, which is the epoxy ester of versatic acid, N,N-bis(2-hydroxypropyl)aniline, Pluracol PEP 650, which is a pentaerythritol-based polyhydric alcohol, polycaprolactone 310, which is a lactone-based polyhydric alcohol, and styrene-allyl alcohol copolymer, all to no avail.

The bisphenol-based polyhydric alcohols have the formula:

$$HO-R'-O-\phenyl-R-\phenyl-O-R'-OH,$$

where R and R' are alkylene groups containing from 1 to 18 carbon atoms, preferably containing from 2–6 carbon atoms. The following derivatives of bisphenol A are preferred:

$$HOCH_2CH_2O-\phenyl-C(CH_3)_2-\phenyl-OCH_2-CH_2OH \quad \text{and}$$

$$CH_3-\underset{OH}{CH}-CH_2O-\phenyl-C(CH_3)_2-\phenyl-OCH_2-\underset{OH}{CH}-CH_3.$$

The proportion of bisphenol-based polyhydric alcohol may vary from 5–75% of the weight of the solution polymer, preferably from 20–50%. As the proportion of polyhydric alcohol is increased, the volatile solvent content can diminish and is desirably in the range of from 50–100% of the weight of the solution copolymer, preferably from 60–85%.

The organic polyisocyanates are useful in this invention as a class, it being preferred to employ at least a stoichiometric proportion thereof, most preferably a 5–40% stoichiometric excess, with respect to the total hydroxy functionality in the copolymer and the polyhydric alcohol. Diisocyanates and polyisocyanates of higher functionality are fully useful, the latter being preferred. The conventional toluene diisocyanates will illustrate the most common useful material, but aliphatic polyisocyanates, such as hexamethylene diisocyanate, are preferred. Higher molecular weight polyisocyanates having an isocyanate functionality of at least 3 are particularly preferred, such as adducts of diisocyanates with polyhydric alcohols, such as trimethylol propane. Particularly preferred is the reaction product of three moles of hexamethylene diisocyanate with one mole of water, which is a triisocyanate having the formula:

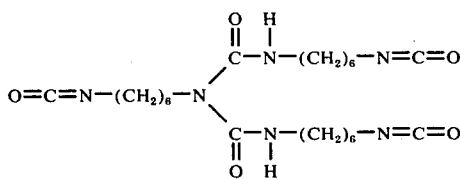

These polyisocyanates and also the solution copolymers are used in solvent solution, and this means that the solvent must be free of active hydrogen and free of water, as is well known.

Thus, the final mixture is a four component mix containing solution copolymer dissolved in inert organic solvent and bisphenol-based polyhydric alcohol, and polyisocyanate. Other conventional materials may also be present, such as flow control agents, catalysts to speed the cure, pigments, fillers, soluble dyes, and the like, as is conventional.

Referring more particularly to the hydroxy functional copolymers which are used, these are solution copolymers. The term "solution copolymer" identifies copolymerization in organic solvent medium which produces an organic solvent soluble resin. The styrene component is critical as previously described. The hydroxy monomer is preferably an hydroxy alkyl acrylate, the alkyl group containing from 2–4 carbon atoms. Hydroxy ethyl acrylate is particularly preferred, and will be illustrated. It is noted in passing that the term hydroxyl is used in its conventional narrow connotation in which it identifies the alcoholic hydroxyl group, and no other group. Indeed, the hydroxyl group and the single ethylenic group are the only reactive groups contemplated in this monomer.

Other hydroxy monomers which may be used are simple adducts of an alkylene oxide containing 2–4 carbon atoms with an alpha,beta-monoethylenically unsaturated carboxylic acid. The oxides are illustrated by ethylene oxide, 1,2-propylene oxide, and 1,2-butylene oxide. The acids are illustrated by acrylic acid, methacrylic acid, crotonic acid, itaconic acid, maleic acid, etc. Thus, hydroxy propyl methacrylate, hydroxy ethyl crotonate, and hydroxy butyl maleate (the mono- or bis-ester) will further illustrate the class of useful monomers.

The solution copolymerization, aside from the presence of the bisphenol-based polyhydric alcohol, is wholly conventional, being normally carried out at reflux in the selected solvent in the presence of a free radical polymerization catalyst, such as benzoyl peroxide, t-butyl perbenzoate, or azobisisobutyronitrile.

The invention is illustrated in the following examples.

EXAMPLE 1

Preparation of High Solids Polyol-Acrylic Resin for Low Energy Cure Coatings

Charge Composition - Parts by Weight 250 2-Ethoxy ethanol acetate
250 Xylene
300 1,1'-isopropylidenebis(p-phenyleneoxy)-di-2-propanol Charge the above to reactor, set reflux condenser and heat to 130° C.

520 Styrene
170 Hydroxyethyl acrylate
15 Tertiarybutyl perbenzoate

Premix the above and add over 3 hours at 130° C. Hold for 1 hour.

3 Tertiarybutyl perbenzoate

Add the above, hold 2 hours and then cool to provide a product having the following final characteristics:

Solids 65%
Viscosity (Gardner-Holdt): Z
Color (Gardner): 1
Hydroxyl number: 166
Ratio of acrylic to polyol: 30% polyol: 70% styrene-acrylic

EXAMPLE 2

Evaluation of Example 1 Hydroxy Acrylic for Performance Characteristics in High Gloss Pigmented Coatings Part A - Pigment Dispersion 243.3 pounds Hydroxy polymer of Example 1
126.3 pounds 2-Ethoxy ethanol acetate
4.65 pounds Pigment suspension agent (Baker's MPA-60 may be used if desired)
621.0 pounds Rutile titanium dioxide Disperse pigment in sand mill to 7 North-Shore grind reading. Add in letdown:

256.7 pounds Hydroxy polymer of Example 1
76.2 pounds 2-Ethoxy ethanol acetate
6.2 pounds 10% solution of nickel salt in Xylol (Mooney Chemical, Cleveland, Ohio — Nickel Hex Cem. can be used).
7.75 pounds 10% Methyl silicone oil flow agent in xylol (Dow Corning DC-230 may be used) Solids (by weight) 71.16%

Part B - Activator Solution 797.8 pounds Hexamethylene Diisocyanate (75% solids in 2-ethoxy ethanol acetate) — Desmodur N-75 may be used.
9.72 pounds 2-ethoxy ethanol acetate
Solids (by weight) 66.67%

For electrostatic spray application, the Part A and Part B are mixed:

81.65% Part A
18.35% Part B

Solids after mixing (at application): 70.0%

Upon admixture, the two components form a solution which thickens gradually with time, but an adequate working period is available for hand spray. For electrostatic spray, the components are mixed on the way to the spray head. The mixture at a viscosity of 28 seconds measured at 65° F. in a No. 2 Zahn Cup is pumped at 400 cc per minute to an electrostatic disc applicator charged to 90 kilovolts and spinning at 3600 revolutions per minute. Electrostatic spray was carried out on grounded steel panels moving at 35 feet per minute past the spray disc at a distance of 13 inches. Atomization was excellent, and the deposited wet film showed no tendency to crater, bubble, or sag. The coated panels were baked briefly at low temperature (10 minutes in a 150° F. oven). The final film had a very good appearance, and a thickness of 1.0 mil. The cured panels were aged for 168 hours at room temperature during which period the coatings hardened from an F pencil hardness to a 2H hardness. The 60° Gloss meter reading was 98, and the coatings were adequately flexible as indicated by passing the ⅛ conical mandrel test, and exhibiting a direct impact in excess of 40 inch pounds. The coatings were strongly adherent to the base, and satisfactorily abrasion resistant. Also, stain resistance and grease resistance were satisfactory.

Although the viscosity in this example is approximately the same as in our prior application, the solids content here is 70–72% whereas, in the prior application, it is about 48%. Thus, the volatile solvent content is reduced from 52% to 28–30%.

Various panels were coated, and some of these provide superior properties, particularly in the areas of impact resistance and flexibility, on the other hand. Accordingly, and for most outstanding results in these categories, the steel should be prerinsed with a rinse solution containing trivalent chromium. It is only in this way that we have been able to pass 240 hours detergent testing in 1.0% synthetic detergent, and 500 hours in 5% salt spray.

In this invention, the steel substrate is cleaned with detergent and rinsed with water, and is then phosphated in conventional fashion with an aqueous solution of zinc or iron phosphate (Bonderite 40 supplied by the Parker Company of Detroit, Michigan, may be used). After rinsing with water, a chromate solution is applied. This solution is aqueous, and it contains trivalent chromium, either alone or together with hexavalent chromium. Parcolene 8 supplied by the said Parker Company may be used.

To more precisely identify the new contribution which has been made, there is presented a Table I which summarizes the manner in which composition changes are related to physical properties and corrosion resistance. Only the styrene-hydroxyethyl acrylate copolymer passes the severe corrosion and flexibility tests of the appliance industry, when utilized in a single coat (no primer) finish.

tures formed in this invention can be cured without exceeding 250° F., preferably without exceeding 200° F. Indeed, as little as 10 minutes in a 150° F. oven is adequate when followed by room temperature ageing for at least a day. With care, simple storage at room temperature will supply an adequate cure, though some heating is helpful to speed the development of a solid surface which is easier to handle in storage.

EXAMPLES 3, 4 5 and 6

Replacement of Isopropylidenebis(p-phenyleneoxy)-di-2-propanol in Example 1 with other polyols Example 3 — Pentaerythritol adduct with propylene oxide (Pluracol PEP 650 may be used)

Example 4 — N,N-bis(2-hydroxypropyl)aniline

Example 5 — Polycaprolactone, molecular weight 310

Example 6 — Trimethylol propane adduct with propylene oxide (Pluracol TP 2540 may be used)

All of the polyhydric alcohols tested in Examples 3–6 failed the detergent test after only 72 hours, whereas Example 1 passed this same test for 240 hours. Also, all of the polyhydric alcohols tested in Examples 3–6 failed the 500 hour salt spray test whereas Example 1 passed this same test. Thus, the asserted criticality is corroborated by detailed comparative tests.

The invention is defined in the claims which follow.

We claim:

1. A low temperature curing polyurethane coating system comprising a liquid mixture of (1) a solution copolymer consisting essentially of 55–85% styrene and monoethylenically unsaturated hydroxy functional monomer, said copolymer being in solution in a mixture of (A) inert water-free volatile organic solvent and (B) a bisphenol having its two phenolic OH groups converted to OR'OH groups where R' is an alkylene group containing from 1 to 18 carbon atoms, said bisphenol being present in an amount of from 5–75%, based on the weight of said solution copolymer; and (2) an organic polyisocyanate in at least a stoichiometric proportion with respect to the total hydroxy functionality in said copolymer, and said bisphenol.

2. A coating system as recited in claim 1 in which said bisphenol-based polyhydric alcohol has the formula:

TABLE I

| | Styrene Polymer Example 1 | Acrylic Polymer | Styrene Acrylic Polymer | Commercial Polyester* |
|---|---|---|---|---|
| Styrene | 53% | | 26.5% | |
| Hydroxy Ethyl Acrylate | 17% | 17% | 17% | |
| Ethyl Acrylate | — | | 26.5% | |
| Methyl Methacrylate | — | 53% | | |
| Polyester (Hydroxy Functional) | | | | 100% |
| Isopropylidenebis(p-phenyleneoxy) di-2-propanol | 30% | 30% | 30% | |
| Humidity, 2000 hours | Pass | Fail | Fail | Fail |
| Detergent Resistance (hours) | Pass 240 | Fail 72 | Fail 72 | Fail 24 |
| 5% Salt Spray Resistance (hours) | Pass 500 | Fail 500 | Fail 500 | Fail 150 |
| Flexibility (¼" Mandrel) | Pass | Pass | Pass | Pass |
| Impact (inch/lbs.) | Pass 40 | Pass 40 | Pass 40 | Pass40 |

*Mobay Chemical Company Polyester Desmophen-650

All of the above coatings were cured by baking 10 minutes at 150° F., followed by 168 hours of ageing at room temperature. This establishes that the liquid mix-

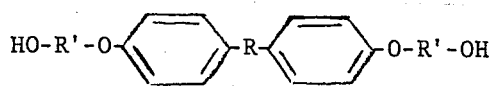

where R and R' are alkylene groups containing from 1 to 18 carbon atoms.

3. A coating system as recited in claim 2 in which R and R' are alkylene groups containing from 2–6 carbon atoms.

4. A coating system as recited in claim 1 in which said bisphenol-based polyhydric alcohol is selected from:

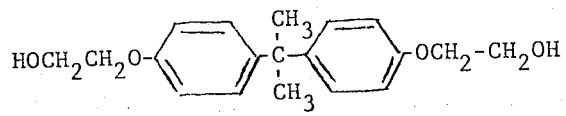

and

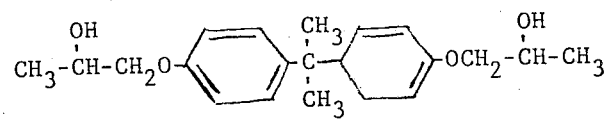

5. A coating system as recited in claim 2 in which said polyisocyanate is present in a stoichiometric excess of 5–40%.

6. A coating system as recited in claim 5 in which said polyisocyanate is an aliphatic polyicocyanate having an isocyanate functionality of at least 3.

7. A coating system as recited in claim 6 in which said polyisocyanate is an adduct of an aliphatic diisocyanate with a polyhydric alcohol containing at least 3 hydroxy groups.

8. A coating system as recited in claim 1 in which said hydroxy functional monomer is a hydroxy alkyl acrylate, the alkyl group containing from 2–4 carbon atoms.

9. A coating system as recited in claim 8 in which said hydroxy functional monomer is hydroxy ethyl acrylate.

10. A coating system as recited in claim 1 in which said styrene is present in an amount of from 65–80%, and the balance of said copolymer consists of adducts of an alkylene oxide containing 2–4 carbon atoms with an alpha,beta-monoethylenically unsaturated carboxylic acid.

11. A low temperature curing polyurethane coating system comprising a mixture of (1) a solution copolymer consisting of 65–80% styrene and monoethylenically unsaturated hydroxy functional monomer which is an adduct of an alkylene oxide containing 2–4 carbon atoms with an alpha,beta-monoethylenically unsaturated carboxylic acid, said copolymer being in solution in (A) inert water-free volatile organic solvent, and (B) a bisphenol-based polyhydric alcohol having the formula

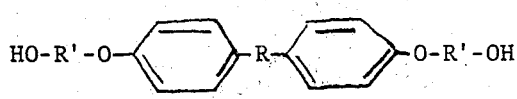

where R and R' are alkylene groups containing from 1 to 18 carbon atoms, and (2) an organic polyisocyanate which is an aliphatic polyisocyanate having an isocyanate functionality of at least 3 said polyisocyanate being present in a stoichiometric excess of 5–40% with respect to the total hydroxy functionality in said copolymer, and said polyhydric alcohol, said polyhydric alcohol being present in an amount of from 20–50% of the weight of the solution copolymer, and said volatile solvent being present in an amount from 50–100% of the weight of the solution copolymer.

12. A coating system as recited in claim 11 in which said volatile solvent is present in an amount of from 60–85% of the weight of the solution copolymer.

* * * * *